ated August 30, 1966

3,270,009
CARBOCYCLIC-SUBSTITUTED ALIPHATIC
CEPHALOSPORINS
Edwin H. Flynn, Indianapolis, Ind., assignor to Eli Lilly
and Company, Indianapolis, Ind., a corporation of
Indiana
No Drawing. Filed Aug. 23, 1961, Ser. No. 133,308
7 Claims. (Cl. 260—243)

This invention relates to novel organic compounds and to methods for their preparation.

The novel compounds of this invention are represented by the following structural formula:

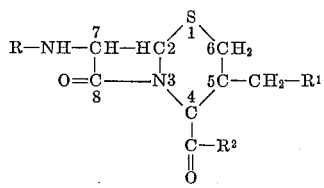

in which $R^1$ (taken alone, is —OH, $C_1$–$C_8$ acyloxy, or tertiary amino, $R^2$ is —OH when $R^1$ is —OH, $R^2$ is —OH when $R^1$ is $C_1$–$C_8$ acyloxy, $R^2$ is —O⁻ when $R^1$ is tertiary-amino, $R^1$ and $R^2$, when taken together, are —O—, and R is represented by the following formula:

in which $R^3$ is straight-chain or branched $C_1$–$C_4$ alkylene, $C_2$–$C_4$ alkenylene, or $C_2$–$C_4$ alkynylene; and $R^4$ is benzyl, naphthyl, $C_4$–$C_6$ cycloalkyl, or adamantyl, or substitution products thereof.

Thus, $R^1$ can be acetoxy, propionoxy, butyroxy, capryloxy, or the like; or N-pyridyl, N-pyrimidyl, trimethylamino, triethylamino, tributylamino or other tertiary-amino group such as those produced by reaction of cephalosporin C with nicotine, nicotinic acid, isonicotinic acid, nicotinamide, 2-aminopyridine, 2-amino-6-methylpyridine, 2,4,6 - trimethylpyridine, 2 - hydroxymethylpyridine, sulfapyridine, 3-hydroxypyridine, pyridine-2,3-dicarboxylic acid, quinoline, sulfadiazine, sulfathiazole, picolinic acid, and the like.

$R^3$ can have the skeletal configuration of methyl, ethyl, n-propyl, isopropyl, n-butyl, isobutyl, sec-butyl, or tert-butyl, optionally with a double bond or a triple bond between two of the carbon atoms, and with $R^4$ substituted for a hydrogen atom thereon.

$R^4$ can be benzyl, α-naphthyl, β-naphthyl, cyclobutyl, cyclopentyl, cyclohexyl, or adamantyl, or substitution products thereof, having in each case one or more chlorine, bromine, fluorine iodine, nitro trifluoromethyl, $C_1$–$C_4$ alkyl, or $C_1$–$C_2$ alkoxy substituents upon the ring.

$R^3$ and $R^4$, when taken together, may comprise a styryl group, a phenethinyl group, or a naphthyl, $C_4$–$C_6$ cycloalkyl, or adamantyl homologue thereof.

The structure and preparation of the adamantyl moiety are described by Stetter in Angewandte Chemie, 66, 217 (1954).

The novel compounds of the present invention are related to cephalosporin C insofar as they contain the 5,6-dihydro-2H-1,3-thiazine ring with a fused β-lactam ring in the 2,3 position which is characteristic of cephalosporin C. However, unlike cephalosporin C, which contains the 5'-amino-N'-adipamyl group in the 7 position, the compounds of the present invention are characterized by a carbocyclic-substituted aliphatic carboxamido group in the 7 position. Moreover, unlike cephalosporin C, which has a relatively low antibacterial action, the compounds of the present invention are highly effective antibacterial agents, capable of inhibiting the growth of numerous types of microorganisms in a variety of environments.

As will be observed from the formulas given above, the invention includes a variety of related compounds having the bicyclic ring structure of cephalosporin C, but with variations in the substituent groups attached thereto. Among such compounds are those having the nuclei of the cephalosporin-type products known as cephalosporin $C_c$, desacetylcephalosporin C, and cephalosporin $C_A$, these nuclei being represented by the following formulas, respectively:

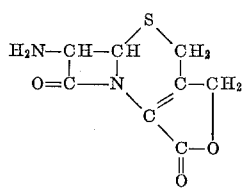

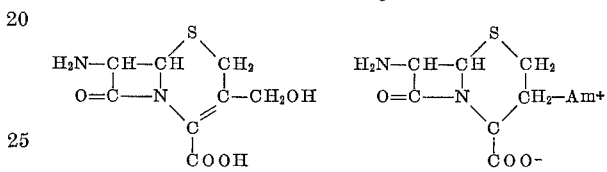

where Am represents a tertiary-amino radical, exemplified above. As will be seen from the above formulas, the nucleus of cephalosporin $C_c$ includes a fused lactone ring, while the nucleus of cephalosporin $C_A$ forms an inner salt or zwitterion.

As is the case with the penicillins, to which the compounds of this invention are in some degree related, numerous salts, esters, amides, and like derivatives thereof can be prepared by combination with nontoxic pharmaceutically acceptable cations, anions, alcohol residues, ammonia, and amines, and such derivatives are to be regarded as the full equivalents of the compounds disclosed and claimed herein, and accordingly are to be considered as within the scope of this invention.

For purpose of illustration, there can be mentioned several types of cationic salts which can be prepared from compounds containing the cephalosporin C nucleus, including, for example, water-soluble salts such as the sodium, potassium, lithium, ammonium, and substituted ammonium salts, as well as the less water-soluble salts such as the calcium, barium, procaine, quinine, and dibenzylethylenediamine salts. Those compounds which contain the cephalosporin $C_A$ nucleus do not form cationic salts but instead form anionic salts, i.e., acid addition salts, with strong acids such as hydrochloric, hydrobromic, phosphoric, sulfuric, and like acids.

The following examples, together with the operating examples appearing hereinafter, will illustrate the types of compounds available in accordance with the present invention:

7-δ-(α'-naphthyl)-n-valeramidocephalosporanic acid
7-β-(β'-naphthyl)acrylamidocephalosporanic acid
7-cinnamamidocephalosporanic acid
7-γ-cyclopentylcrotonamidocephalosporanic acid
7-α-cyclohexyl-3-butenoamidocephalosporanic acid
7-styrylacetamidocephalosporanic acid
7-phenylpropiolamidocephalosporanic acid
7-p-nitrophenylpropiolamidocephalosporanic acid
7-cyclobutylpropynoamidocephalosporanic acid
7-α-phenylcrotonamidocephalosporanic acid
7-α-benzylacrylamidocephalosporanic acid
7-α-p-bromophenylacrylamidocephalosporanic acid
7-β-p-isopropylphenylacrylamidocephalosporanic acid
7-allocinnamamidocephalosporanic acid
7-β-methylstyrylacetamidocephalosporanic acid 7-γ-benzylcrotonamidocephalosporanic acid
7-β-(β'-naphthyl)-α,α-dimethylpropionamidocephalosporanic acid
7-α-(α'-naphthyl)isovaleramidocephalosporanic acid
7-α-o-chlorophenyl-α-methyl-n-butyramidocephalosporanic acid
7-β-(2'-fluorocyclobutyl)propionamidocephalosporanic acid
7-δ-(3'-methylcyclopentyl)-n-butyramidocephalosporanic acid
7-α-p-trifluoromethylphenylpropionamidocephalosporanic acid
7-o-methoxybenzylacetamidocephalosporanic acid
7-β-p-ethoxyphenylisobutyramidocephalosporanic acid and the like, including the cephalosporin $C_A$ and cephalosporin $C_c$ analogues thereof.

Cephalosporin C can be prepared by cultivating a cephalosporin C-producing organism in a suitable nutrient medium, as described in British patent specification 810,196, published March 11, 1959.

Cephalosporin C is really converted into cephalosporin $C_c$ by heating with water under acid conditions, as described in Belgian Patent 593,777, published November 30, 1960. This removes the acetyl group from its point of attachment through oxygen to the methyl group in the 5 position of the thiazine ring, and lactonization then spontaneously occurs, yielding the fused cyclic lactone.

Cephalosporin C is also readily converted into compounds of the cephalosporin $C_A$ type by refluxing in aqueous solution with an excess of pyridine, for example, as described in Belgian Patent 593,777. The reaction is applicable in general to the tertiary amines, of which numerous examples are given above, yielding corresponding derivatives of the cephalosporin $C_A$ type wherein the tertiary amine is attached to the methyl group in the 5 position of the thiazine ring, and forms an inner salt with the carboxyl group in the 4 position.

Desacetylcephalosporin C is conveniently prepared by treating cephalosporin C with citrus acetylesterase for several hours in aqueous phosphate buffer at pH 6.5–7 according to the method of Jansen, Jang, and MacDonnell, Archiv. Biochem., 15 (1947), 415–31.

From the various cephalosporin C compounds thus available, the corresponding nucleus is readily obtained by cleaving the 5'-amino-N'-adipamyl side chain between its amido nitrogen and its amido carbonyl group. Thus, 7-aminocephalosporanic acid can be obtained by digesting cephalosporin C for an extended period in the presence of a mineral acid and in the absence of light, according to the method described in Belgian Patent 593,777.

The compounds of the present invention are prepared by acylation of the appropriate cephalosporin C nucleus, be it the nucleus of cephalosporin C itself or of cephalosporin $C_c$, or cephalosporin $C_A$, or other variant. Alternatively, compounds of the cephalosporin $C_c$, $C_A$, and desacetylcephalosporin C classes can be obtained by applying to appropriate 7-acylamidocephalosporanic acids the conversion procedures of Belgian Patent 593,777 and of Jansen et al. to produce compounds having the respective nuclei.

For the acylation of the 7-amino group of the cephalosporin nucleus, as defined above, any of the conventional acylation procedures can be employed, utilizing any of the various types of known acylating agents having a composition which yields the desired side chain.

A convenient acylating agent is the appropriate carbocyclic-substituted aliphatic acyl chloride or bromide. The acylation is carried out in water or an appropriate organic solvent, preferably under substantially neutral conditions, and preferably at reduced temperature, i.e., above the freezing point of the reaction mixture and up to about 20° C. In a typical procedure, 7-aminocephalosporanic acid or one of its derivatives as defined herein, together with a sufficient quantity of sodium bicarbonate or other appropriate alkali to promote solution, is dissolved in aqueous 50 volume-percent acetone, the concentration of the 7-aminocephalosporanic acid being about 1 to about 4 percent by weight. The solution is cooled to around 0 to 5° C., and a solution of the acylating agent is added in about 20 percent excess, with stirring and cooling. The pH of the mixture can be maintained, if it tends to vary, around the neutral level by bubbling carbon dioxide therein. After addition of the acylating agent has been completed, stirring of the reaction mixture is continued, and the mixture is allowed to warm to room temperature. The reaction product is then acidified to around pH 2 and extracted with an organic solvent such as ethyl acetate. The ethyl acetate extract is adjusted to around pH 5.5 with a base containing the desired cation of the final product, and is extracted with water. The water solution is separated and evaporated to dryness. The residue is taken up in the minimum quantity of water, and the desired product is precipitated by adding a large excess of acetone and, if necessary, ether. The crystalline product obtained thereby is filtered, washed with acetone, and dried.

Acylation can also be carried out with the corresponding carbocyclic-substituted aliphatic carboxylic acid, employed in conjunction with an equimolar proportion of a carbodiimide such as N,N'-diisopropylcarbodiimide, N,N' - dicyclohexylcarbodiimide, N,N' - bis(p - dimethylaminophenyl)carbodiimide, N-ethyl - N' - (4" - ethylmorpholinyl)carbodiimide, or the like, and the acylation proceeds at ordinary temperatures in such cases.

Alternatively, the carbocyclic-substituted aliphatic carboxylic acid can be converted into the corresponding acid anhydride, or into the azide, or into an activated ester, and any of these derivatives can be used to effect the desired acylation. Other agents can readily be ascertained from the art.

In many cases, the acylating agent may contain one or more asymmetric carbon atoms and thus exist in optically active forms. When prepared by ordinary chemical means, such compounds are ordinarily obtained in racemic form—i.e., an equimolar mixture of the optical isomers, having no optical rotation. When the separate optical isomers are desired, the acylating agent can be resolved in a conventional manner such as by reacting the free acid with cinchonine, strychnine, brucine, or the like, then fractionally crystallizing to separate the diestereoisomeric salts, and separately acidifying the solid phase and the liquid phase to liberate the optical isomers. The free acids thus obtained can be employed as such for the acylation, preferably in conjunction with a carbodiimide, or may be converted by conventional means into the corresponding acid halide or into a mixed anhydride, care being exercised to avoid extremes of conditions which might produce racemization.

Many of the acylating agents, together with methods for their preparation, are described in the literature, and a number of them are commercially available. All of them are readily prepared by methods well known in the art.

The invention will be more readily understood from the following operating examples, which are submitted as illustrations only, and not by way of limitation. The chemical assays reported herein were carried out by the method of Ford, Analytical Chemistry, 19, 1004 (1947), which is based upon the quantitative determination of the β-lactam moiety of the cephalosporin molecule via reaction with hydroxylamine. The antibiotic potencies were determined against Staphylococcus aureus 209 P by an appropriate modification of the paper disc plate methods of Higgens et al., Antibiotics & Chemotherapy, 3, 50–54 (January 1953) and Loo et al., Journal of Bacteriology, 50, 701–709 (1945). The $pK'_a$ values were determined by titration in aqueous 66 percent dimethylformamide.

*Example 1.—7-α-phenylpropionamidocephalosporanic acid*

One gram of 7-aminocephalosporanic acid was suspended in 50 ml. of water, and 1.0 g. of sodium bicarbonate was added. After solution was complete, 50 ml. of acetone were added, and the solution was stirred and cooled in an ice bath. To the cold solution was added a solution of 624 mg. of α-phenylpropionyl chloride in 15 ml. of acetone over a period of one hour at 5° C. The acetone was stripped off under vacuum. To the residual aqueous solution were added 75 ml. of ethyl acetate, and the mixture was adjusted to pH 2 with 1 N hydrochloric acid. The layers were separated, and the ethyl acetate layer was back-extracted at pH 5.5 with 75 ml. of water, pH adjustment being effected with aqueous 1 N potassium hydroxide solution. The aqueous extract was stripped under vacuum, and the residue was purified by dissolving in acetone, stripping, dissolving in hot methanol, diluting with isopropyl alcohol to the point of turbidity, and stripping to a solid. The yield was 1220 mg. of 7-α-phenylpropionamidocephalosporanic acid in the form of the potassium salt, having a $pK'_a$ of 4.98 and a maximum in its ultraviolet absorption spectrum at 259 m$\mu$ ($\epsilon$=7,670).

*Example 2.—7-β-phenylpropionamidocephalosporanic acid*

7-aminocephalosporanic acid (1.0 g.) and sodium bicarbonate (1 g.) were dissolved in a mixture of 50 ml. of water and 40 ml. of acetone. The solution was stirred in an ice bath and to it were added 590 mg. of β-phenylpropionyl chloride dissolved in 10 ml. of acetone over a period of about 30 minutes, after which the mixture was stirred 2 to 3 additional hours in the cold. The reaction product mixture was then stripped of acetone under vacuum, and 100 ml. of ethyl acetate were added, followed by 1 N hydrochloric acid to adjust the mixture to pH 2. The aqueous phase was separated, washed with 50 ml. of ethyl acetate, and discarded. The ethyl acetate layers were combined and washed with 50 ml. of water. The washed ethyl acetate phase was stirred with 100 ml. of water and adjusted to pH 5.5 with aqueous 0.5 N potassium hydroxide solution. The resulting aqueous extract was separated and evaporated to dryness under vacuum. The residue was triturated with aqueous acetone, and the solids were filtered off and dried under vacuum. The yield was 640 mg. of 7-β-phenylpropionamidocephalosporanic acid in the form of the potassium salt, having a $pK'_a$ of 5.0 and a maximum in its ultraviolet absorption spectrum at 259 m$\mu$ ($\epsilon$=8,920).

The product compound had a chemical assay of 1460 penicillin G units per milligram, and an antibiotic potency of 200 penicillin G units per milligram. It showed good antibiotic activity against resistant staphylococci in the presence and in the absence of human blood serum. It also showed good activity against *Staphylococcus albus*, *Bacillus subtilis*, and *Sarcina lutea*.

*Example 3.—7-α-phenyl-n-butyramidocephalosporanic acid*

7-α-phenyl-n-butyramidocephalosporanic acid was prepared in the form of the potassium salt according to the procedure of Example 2, employing 640 mg. of α-phenyl-n-butyryl chloride. The yield was 800 mg. of product having a $pK'_a$ of 4.85 and a maximum in its ultraviolet absorption spectrum at 260 m$\mu$ ($\epsilon$=7,910). The product had a chemical assay of 1160 penicillin G units per milligram and good antibiotic activity against resistant staphylococci in the presence and in the absence of human blood serum. It also showed good activity against *Staphylococcus albus*, *Bacillus subtilis*, and *Sarcina lutea*.

*Example 4.—7-γ-phenyl-n-butyramidocephalosporanic acid*

7-γ-phenyl-n-butyramidocephalosporanic acid was prepared in the form of the potassium salt according to the procedure of Example 2, employing 640 mg. of γ-phenylbutyryl chloride. The product weighed 590 mg. and had a chemical assay of 1305 penicillin G units per milligram.

Another preparation of the same compound was found to have a $pK'_a$ of 4.80 and a maximum in its ultraviolet absorption spectrum at 259 m$\mu$ ($\epsilon$=8,840).

A third preparation was found to have an antibiotic potency of 320 penicillin G units per milligram, and good antibiotic activity against resistant staphylococci in the presence and in the absence of human blood serum. It also showed good activity against *Staphylococcus albus*, *Bacillus subtilis*, and *Sarcina lutea*.

*Example 5.—7-γ-o-chlorophenyl-n-butyramidocephalosporanic acid*

7-aminocephalosporanic acid (1.0 g.) and sodium bicarbonate (800 mg.) were dissolved in a mixture of 50 ml. of water and 40 ml. of acetone. The solution was stirred in an ice bath and to it were added dropwise 760 mg. of γ-o-chlorophenyl-n-butyryl chloride dissolved in 10 ml. of acetone over a period of about 30 minutes, after which the mixture was stirred 3 additional hours in the cold. The reaction product mixture was stripped of acetone under vacuum, and 100 ml. of ethyl acetate were added, followed by 1 N hydrochloric acid to adjust the mixture to pH 2. The aqueous phase was separated, washed with 50 ml. of ethyl acetate, and discarded. The ethyl acetate layers were combined and washed with 50 ml. of water. The washed ethyl acetate phase was stirred with 50 ml. of water and adjusted to pH 6.5 with aqueous 0.5 N potassium hydroxide solution. The resulting aqueous extract was separated and evaporated nearly to dryness under vacuum. The residue was triturated with isopropyl alcohol, and the resulting slurry was filtered. The solids were crystallized from a mixture of methyl and isopropyl alcohols, and 770 mg. of purified 7-γ-o-chlorophenyl-n-butyramidocephalosporanic acid were obtained in the form of the potassium salt, having a $pK'_a$ of 4.85 and a maximum in its ultraviolet absorption spectrum at 260 m$\mu$ ($\epsilon$=8,590). The product had a chemical assay of 790 penicillin G units per milligram, an antibiotic potency of 640 penicillin G units per milligram, and good antibiotic activity against resistant staphylococci in the presence and in the absence of human blood serum. It also showed good activity against *Staphylococcus albus*, *Bacillus subtilis*, and *Sarcina lutea*.

*Example 6.—7-cinnamamidocephalosporanic acid*

7-aminocephalosporanic acid (1.5 g.) and sodium bicarbonate (950 mg.) were dissolved in a mixture of 50 ml. of water and 40 ml. of acetone. The resulting solution was cooled in an ice bath, and to it was added a solution of 850 mg. of cinnamyl chloride in 10 ml. of acetone over a period of 45 minutes, after which stirring was continued for 1.5 additional hours. The reaction product mixture was stripped of acetone, layered with 50 ml. of ethyl acetate, and acidified to pH 2.0 with hydrochloric acid. The ethyl acetate layer was separated and back-extracted into water at pH 5.5, the pH adjustment being carried out with dilute aqueous potassium hydroxide solution. The aqueous extract was concentrated to a syrup and solidified by dilution with acetone, and the resulting solids were recrystallized from a mixture of methyl and ethyl alcohols. The yield was 400 mg. of crystalline 7-cinnamamidocephalosporanic acid in the form of the potassium salt having a $pK'_a$ of 4.75, maxima in its ultraviolet absorption spectrum at 217 and 275 m$\mu$ ($\epsilon$=18,400 and 27,900, respectively), with a shoulder at 222 m$\mu$, and in infrared spectrum compatible with the expected structure.

*Example 7.—7-(4'-phenyl-3'-butynoylamido)cephalosporanic acid*

To a solution of 1.0 g. of 7-aminocephalosporanic acid and 680 mg. of sodium bicarbonate in 50 ml. of water and 30 ml. of acetone was added dropwise with stirring at ice bath temperature a solution of 656 mg. of 4-phenyl-3-butynoyl chloride in 20 ml. of acetone. The pH of the reaction mixture was continuously monitored and maintained at 7 to 8. The reaction mixture was stirred at 0 to 5° C. for one hour following the addition of the acyl chloride. The acetone was stripped out of the reaction product mixture, and the residual aqueous solution was layered with about 100 ml. of ethyl acetate, then adjusted to pH 2 with dilute hydrochloric acid. The ethyl acetate layer was separated, added to about 100 g. of ice, and adjusted to pH 5.5 with dilute aqueous potassium hydroxide solution. The aqueous phase was separated and stripped to dryness under vacuum. The residue was washed with acetone and dried. Yield, 480 mg. of 7-(4'-phenyl-3'-butynoylamido)cephalosporanic acid potassium salt, having a $pK'_a$ of 4.85 and maxima in its ultraviolet absorption spectrum at 237 and 247 m$\mu$ ($\epsilon$=20,450 and 20,200, respectively). The product had a chemical assay of 1348 penicillin G units per milligram and an antibiotic potency of 405 penicillin G units per milligram. It had good activity against resistant staphylococci in broth and against *Staphylococcus albus, Bacillus subtilis*, and *Sarcina lutea*.

*Example 8.—7-cyclopentylacetamidocephalosporanic acid*

7-cyclopentylacetamidocephalosporanic acid was prepared in the form of the potassium salt by reaction of 7-aminocephalosporanic acid (1.0 g.) with sodium bicarbonate (680 mg.) and cyclopentylacetyl chloride (510 mg.) generally according to the procedure of Example 6. The product weighed 450 mg. and had a $pK'_a$ of 4.80 and a maximum in its ultraviolet absorption spectrum at 260 m$\mu$ ($\epsilon$=8,000). It had a chemical assay of 1420 penicillin G units per milligram, an antibiotic potency of 91 penicillin G units per milligram, and good antibiotic activity against resistant staphylococci in the presence and in the absence of human blood serum. It also showed good activity against *Staphylococcus albus, Bacillus subtilis*, and *Sarcina lutea*.

*Example 9.—Desacetyl-7-cyclopentylacetamidocephalosporanic acid*

Desacetyl-7-cyclopentylacetamidocephalosporanic acid was prepared in the form of the potassium salt by a method comprising the following steps.

A lyophilized orange flavedo, prepared by the method of Jansen, Jang, and MacDonnell, referred to above, was first purified as in the following procedure.

A 60.8 g. portion of the lyophilized solid is commingled with water to a total volume of 304 ml., and the suspension is centrifuged in the cold at 15,000 r.p.m. The supernatant liquid is poured off and filtered in the cold to separate suspended lipids. To the filtrate (265 ml.) are added 15.9 g. of Darco G–60 activated carbon, and the mixture is stirred slowly for 15 minutes in the cold, then centrifuged in the same manner. The supernatant liquid (220 ml.) is poured off, and to it are slowly added 53.2 g. of ammoniumsulfate crystals with stirring, giving a solution 43 percent saturated with ammonium sulfate. The mixture is again centrifuged and the precipitate is discarded. To the supernatant liquid (235 ml.) are slowly added 63.5 g. of ammonium sulfate with cooling and stirring, giving a solution 80 percent saturated with ammonium sulfate. The mixture is again centrifuged, and this time the supernatant liquid is discarded. The solids are dissolved in cold water and brought to a volume of 73 ml. The resulting solution of purified citrus acetylesterase is adjusted to pH 7 with aqueous 1 N sodium hydroxide solution just prior to use.

The deacetylation reaction is carried out in the following way. The cephalosporanic acid salt is dissolved in water to a concentration of 0.05 molar and adjusted, as necessary, to pH 7 with aqueous base. To the solution is added 25 percent by volume of 0.1 M pH 7 phosphate buffer, followed by 50 percent by volume (of the original solution) of purified citrus acetylesterase solution prepared as described above. The resulting mixture is diluted 1:1 in water, then held in a beaker at 37° C. with slow stirring, the pH being maintained at 7 by dropwise addition of aqueous base. Exposure to these conditions is continued (ordinarily for about 6 hours) until a parallel Warburg control, described below, indicates completion of the reaction.

The Warburg control is run in the following manner. Into the body of a Warburg flask is placed 0.4 ml. of the original solution of the cephalosporanic acid compound and 1.3 ml. of water. Into the side arm is placed 0.2 ml. of the purified citrus acetylesterase preparation. An aqueous 1 M solution of sodium bicarbonate is saturated with carbon dioxide, and 0.25 ml. is added to the body of the flask, and 0.05 ml. to the side arm. The manometer, having been purged with carbon dioxide, is immediately attached. The gas is allowed to flow for 15 minutes at room temperature, and is then turned off. The apparatus is allowed to equilibrate 15 minutes in the 37° C. constant-temperature bath, the side arm being open at first to permit venting, then closed. The contents of the side arm are then poured into the body of the flask and rinsed back and forth, thus initiating the deacetylation reaction, as evidenced by the evolution of carbon dioxide. The reaction is complete when gas evolution ceases.

A 4.0-g. portion of 7-cyclopentylacetamidocephalosporanic acid potassium salt was treated in the foregoing manner. The resulting solution was layered with ethyl acetate and acidified to pH 2.0 with 1 N hydrochloric acid. The layers were separated, and the ethyl acetate extract was divided into two equal portions.

One portion of the ethyl acetate extract was adjusted in the cold to pH 5.8 with aqueous 1 N potassium hydroxide solution, and the layers were separated. The aqueous layer was evaporated to dryness under vacuum. The residue was dissolved in methanol, filtered, diluted with isopropyl alcohol to the point of turbidity, and concentrated. The resulting white solid was filtered off and recrystallized from methyl and isopropyl alcohols. The yield was 1.2 g. of desacetyl-7-cyclopentaylacetamidocephalosporanic acid potassium salt, having a $pK'_a$ of 4.75 and a maximum in its ultraviolet absorption spectrum at 260 m$\mu$ ($\epsilon$=7,360).

*Example 10.—Lactone derivative of 7-cyclopentylacetamidocephalosporanic acid*

The remaining half of the ethyl acetate extract prepared in Example 9 was concentrated to dryness under vacuum. The residue was commingled with 125 ml. of acetic anhydride, stirred overnight, and concentrated to dryness under vacuum. The residue was commingled with 25 ml. of water and 50 ml. of ethyl acetate and adjusted to pH 5.8 with aqueous 1 N potassium hydroxide solution. A solid substance lying between the phases was collected, washed with water and ethyl acetate, and dried (weight, 100 mg.).

The ethyl acetate layer was separated, washed with a small amount of water, and concentrated to dryness under vacuum.

The resulting residue and the interphase solid material were combined and heated with 30 ml. of ethyl acetate and 10 ml. of water, then cooled. The resulting solid was filtered off and dried. It was found to weigh 750 mg., contained no titratable group, and had a maximum in its ultraviolet absorption spectrum at 257 m$\mu$ ($\epsilon$=7,380). It was thus shown to be the lactone analogue of 7-cyclopentylacetamidocephalosporanic acid.

*Example 11.—7-adamantylacetamidocephalosporanic acid*

7-aminocephalosporanic acid (1.0 g.) was acylated with 787 mg. of adamantylacetyl chloride according to the procedure and under the conditions of Example 1. The yield was 260 mg. of 7-adamantylacetamidocephalosporanic acid in the form of the potassium salt, having a pK′$_a$ of 4.80 and a maximum in its ultraviolet absorption spectrum at 260 mµ (ε=7,425).

I claim:

1. An antibiotic substance of the class represented by the following formulas:

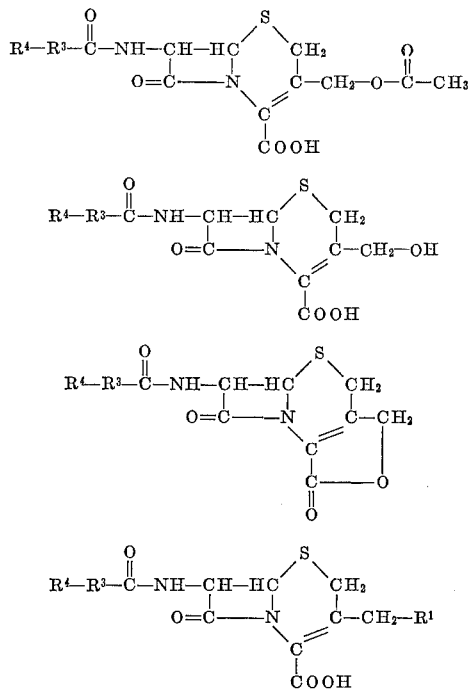

wherein $R^1$ is a member of the class consisting of N-pyridyl and N-pyridyl having at least one substituent, said substituent being selected from the class consisting of carboxy, carbamyl, amino, methyl, hydroxymethyl, and hydroxy;

$R^3$ is a member of the class consisting of $C_1$–$C_4$ alkylene, $C_2$–$C_4$ alkenylene, and $C_2$–$C_4$ alkynylene;

when $R^3$ is $C_1$–$C_4$ alkylene, $R^4$ is a member of the class consisting of naphthyl, $C_4$–$C_6$ cycloalkyl, and adamantyl, and the substitution products thereof having at least one substituent, said substituent being a member of the class consisting of halogen, nitro, trifluoromethyl, $C_1$–$C_4$ alkyl, and $C_1$–$C_2$ alkoxy;

when $R^3$ is a member of the groups consisting of $C_2$–$C_4$ alkenylene and $C_2$–$C_4$ alkynylene, $R^4$ is a member of the class consisting of benzyl, naphthyl, $C_4$–$C_6$ cycloalkyl, and adamantyl, and the substitution products thereof having at least one substituent, said substituent being a member of the class consisting of halogen, nitro, trifluoromethyl, $C_1$–$C_4$ alkyl, and $C_1$–$C_2$ alkoxy; and the salts thereof with pharmaceutically acceptable cations and anions.

2. 7-cinnamamidocephalosporanic acid.

3. 7 - (4′ - phenyl - 3′ - butynoylamido)cephalosporanic acid.

4. 7-cyclopentylacetamidocephalosporanic acid.

5. Desacetyl-7 - cyclopentaylacetamidocephalosporanic acid.

6. The lactone derivative of 7-cyclopentylacetamidocephalosporanic acid.

7. 7-adamantylacetamidocephalosporanic acid.

References Cited by the Examiner

UNITED STATES PATENTS

| | | | |
|---|---|---|---|
| 2,941,995 | 6/1960 | Doyle et al. | 260—239.1 |
| 3,202,656 | 8/1965 | Abraham et al. | |
| 3,207,755 | 9/1965 | Abraham et al. | |
| 3,219,662 | 11/1965 | Abraham et al. | |

FOREIGN PATENTS 593,777  12/1960  Belgium.

OTHER REFERENCES

Abraham et al.: Endeavour, vol. XX, No. 78, pp. 92–100, April 1961.

Burger, Medicinal Chemistry, page 46 (1960).

Wertheim, Textbook of Organic Chemistry, pages 763–764 (1945).

NICHOLAS S. RIZZO, Primary Examiner.

HENRY R. JILES, Examiner.

JAMES W. ADAMS, JR., Assistant Examiner.